United States Patent [19]

St. Clair

[11] 4,166,170

[45] Aug. 28, 1979

[54] MIXED DIAMINES FOR LOWER MELTING ADDITION POLYIMIDE PREPARATION AND UTILIZATION

[75] Inventor: Terry L. St. Clair, Poquoson, Va.

[73] Assignee: The United States of America as represented by the Administrator of the National Aeronautics and Space Administration, Washington, D.C.

[21] Appl. No.: 839,963

[22] Filed: Oct. 6, 1977

[51] Int. Cl.$^2$ .............................................. C08G 73/10
[52] U.S. Cl. ................................... 528/229; 428/474; 264/137
[58] Field of Search ........................................ 528/229

[56] References Cited

U.S. PATENT DOCUMENTS

| | | | |
|---|---|---|---|
| 3,632,428 | 1/1972 | Lubowitz et al. | 528/229 X |
| 3,697,345 | 10/1972 | Vaughan et al. | 528/229 X |
| 3,708,370 | 1/1973 | Lubowitz et al. | 528/229 X |

*Primary Examiner*—Lester L. Lee
*Attorney, Agent, or Firm*—Wallace J. Nelson; John R. Manning; Howard J. Osborn

[57] ABSTRACT

A novel addition polyimide based on the use of liquid monomers wherein the essentially solventless prepreg produced therefrom retains good drape, tack and other mechanical properties.

3 Claims, No Drawings

MIXED DIAMINES FOR LOWER MELTING ADDITION POLYIMIDE PREPARATION AND UTILIZATION

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The concept of depression of melting points by mixing two or more pure components is well known in the fields of alloying metals and organic chemistry. For example, when an organic material having a melting point of 200° C. is mixed in a 50:50 ratio with another organic material having a melting point of 175° C., the resulting mixture may very well have a melting point of 90° C. This effect is often attributed to the interaction or mixing of the two components in the liquid state thus making it difficult for either of the constituents to assume their preferred crystalline or solid state. When considering organic compounds, the ones that tend to form very thermodynamically stable crystals experience the greatest depression in melting point especially when mixed with a compound having a different crystalline structure. For high molecular weight polymers, this depression is not very pronounced unless the polymer is crystalline. The family of polymers known as polyimides are well known to be amorphous and by mixing two different polyimides you would therefore not expect a significant lowering of either the softening or melting points. One approach to preparing polyimides that does lend itself to the lowering of melting point concept is via the addition polymerization route. This process involves the preparation of an oligomeric imide having vinyl endcaps and generally represented by the formula:

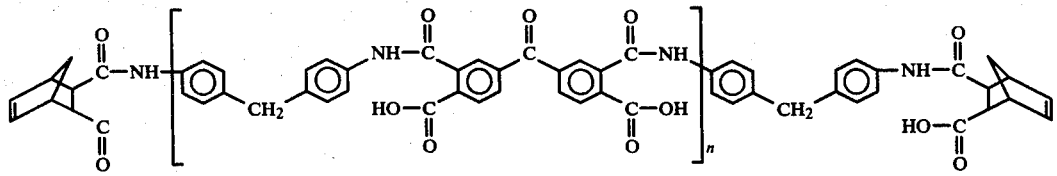

and where R is selected from aromatic amines such as

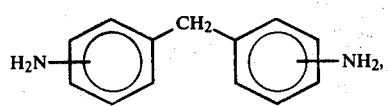

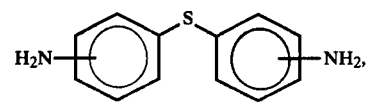

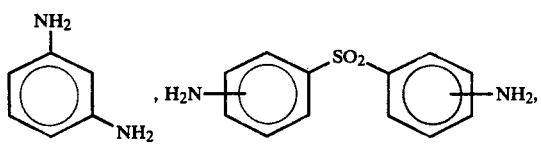

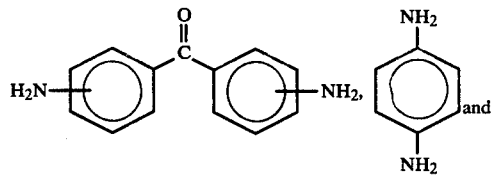

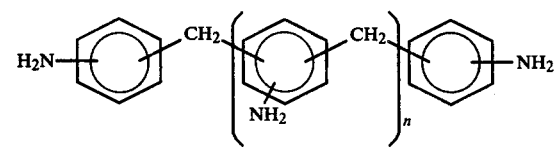

where n=0, 1, 2, 3 . . . .

When an oligomer of this type is heated it generally melts and polymerizes at the proper temperature through the vinyl linkage.

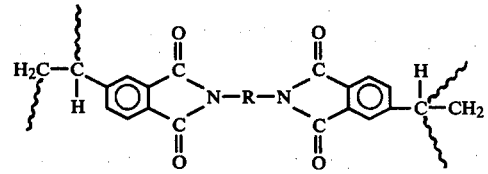

The resultant polymeric material is highly crosslinked and is therefore thermoset. By polymerizing this type of material "in place" it is useful as an adhesive. This same processing method must be used for the preparation of fiber reinforced composites where the polymerization encapsulates the reinforcement and is set. Also this process is used whereby epoxies serve as adhesives and for composite matrix resins.

One particularly attractive addition-type polyimide that is commercially available is Ciba Geigy's P-13N which has the following structure:

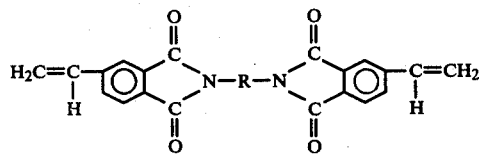

where n=1 or 2.

When this material is heated at 550°–600° F., the imide ring forms, liberating water, and the vinyl portion of the molecule undergoes polymerization to form a highly crosslinked, thermally stable polymer. This particular system has drawbacks in that the oligomer is a solid which makes for a very "boardy" prepreg when composites are to be fabricated since the resin system undergoes very little or no melt during the processing cycle. This lack of melt necessitates the use of extremely high pressure, for example more than 1000 psi, in order to fabricate consolidated composite parts. If the matrix resin were meltable at reasonable temperatures, the pressure could be considerably less and the process more readily useable.

There is thus a definite need in the art for a reduced temperature polymerization process for polyimide preparation.

Accordingly, an object of the present invention is provide an improved process for preparing addition type polyimides that may be employed in a "hot melt" prepregging without the use of additional solvents.

Another object of the present invention is a process for reducing the polymerization temperature of addition type polyimides.

Another object of the present invention is a novel polyimide having a reduced melting temperature.

Another object of the present invention is a novel process of preparing an improved prepreg for use in fabricating composite structures.

BRIEF SUMMARY OF THE INVENTION

According to the present invention, the foregoing and other objects are attained by employing a mixture of methylene dianilines as the diamine portion of the oligomer in an addition polymerization process to produce an oligomer that is tacky and "nonboardy" when used to form a prepreg. This mixed diamine oligomer melts in the 175°–200° C. temperature range during processing and requires only approximately 200 psi molding pressure to fabricate composite structures that have equal or better physical property characteristics than those produced previously at 1000 psi molding pressure.

Composites prepared from these oligomers can be thermoformed at elevated temperatures after an initial molding in the 175°–200° C. temperature range due to this lowered melting temperatures of the mixed diamines.

DETAILED DESCRIPTION

A more complete appreciation of the invention and many of the attendant advantages thereof will be better understood when considered by reference to the following specific examples.

EXAMPLE 1

A mixture of 1.34 moles (432 g) of benzophenonetetracarboxylic acid dianhydride (BTDA) and 2.44 moles of nadic anhydride (NA), also known as norbornene dicarboxylic acid anhydride, are heated to 75°–80° C. with 5.20 moles (plus a slight excess) of ethanol to form the diethylester of BTDA (BTDE) and the ethylester of NA (NE). This mixture of BTDE and NE remain liquid when maintained at 40°–50° C.

This ester mixture with a mixture of amines having a total amine content of 5.10–5.20 moles (504 g). This balance allows for later reaction of the amines with the ester acids of BTDE and NE to form imide rings. The mixture of amines is composed of isomers of methylenedianilines (MDA) in essentially the following percentages:

o,o'—MDA—3.20%
o, p'—MDA—15.70%
p, p'—MDA—66.00%

Also included in the amine mixture are the tri and tetrafunctional amines

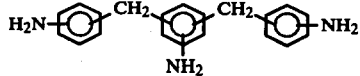

4.50% all isomers, and

10.60% all isomers.

The amine mixture remains liquid because the large number of isomers, all of which are solid at room temperature, tend to retard crystallization because of the high degree of disorder, or large entropy factor, which makes it difficult for nucleation and subsequent crystallization to occur. This liquid mixture is further stabilized in the liquid state when mixed with the ester mixture.

This mixture of monomers which can then be used without a carrier solvent for prepregging onto fibers allows for the formation of a tacky (or sticky) and drapeable, i.e. easy to contour, prepreg which is highly desirable for composite or laminate fabrication in that complex shapes are easier to fabricate.

Other amine mixtures and amine-ester mixtures may also be utilized to form useful liquid laminating resins that are adaptable for "hot melt" prepregging onto fibers.

EXAMPLE II

To a 500 ml RB flask equipped with magnetic stirring are added 108 g (0.335 M) of BTDA and 100 g (0.610 M) of nadic anhydride. Next is added 300 g of absolute ethanol and the mixture heated to 50°–60° C. until solution occurs, i.e. approximately 90 minutes. This mixture is cooled to room temperature and added to a vessel containing 126 g (0.539 M) of Jeffamine AP-22 (a tradename for a mixture of diamines sold by the Jefferson Chemical Company, Inc., Houston, TX). This mixture was stirred for approximately one hour at room temperature to obtain a homogeneous condition.

|  |  | Functional Equivalent |
| --- | --- | --- |
| Nadic anhydride | 0.6098 moles | 0.6098 |
| BTDA | 0.3354 moles | 0.6708 |
|  |  | 1.2806 |

Jeffamine AP-22 - average molecular weight - 234
2.3–2.4 amines/mole amine equivalent - 1.239–1.292.

This homogenous mixture may then be used for prepregging onto fibers as described in Example I.

EXAMPLE III

The BTDE (0.335 mole) and NE (0.610 mole) were dissolved in 200 g of absolute ethanol. To this was added the Jeffamine AP-22 (0.539 mole) and the mixture stirred for one hour at room temperature to obtain a homogenous mixture. Since the ester-acid result tends to disproportionate on standing, a characteristic of imide prepolymers, the mixture should be refrigerated to extend the shelf life thereof. The BTDE and NE may be obtained commercially from specialty chemical companies or may be made by refluxing the stoichiometric amounts of benzophenonetetracarboxylic acid dianhydride (BTDA) and nadic anhydride (NA) with excess ethanol.

EXAMPLE IV

The homogeneous ester-acid imide prepolymer obtained in Example III was heated in the temperature range of 50°–70° C. to reduce the viscosity thereof and brushed onto Hercules HT-S graphite fiber, drum wound at a spacing of 5½ tows per inch, to yield prepreg with a fiber content of 50% by weight. The prepreg was air-dried on the rotary drum for approximately eight hours to reduce solvent content to approximately 9% by weight. At this point the material had drape, tack, and could be easily cut and formed into shaped layups.

EXAMPLE V

The prepreg formed in Example IV was cut into 7.6 cm by 17.8 cm (3 inch×7 inch) laminae and stacked into a 19-ply unidirectional preform. The preform billet for press molding was consolidated under simulated autoclave conditions, using 7–14 kPa (2–4 inch Hg) vacuum. Each billet was heated at a rate of 2.8 K (5° F.) per minute to 436 K (325° F.), held at this temperature for one hour and then cooled under vacuum to room temperature. Weight loss during the consolidation and imidization step ranged between 25% and 29% and provided a well-formed billet averaging 32% resin by weight. When billets were consolidated for full autoclave molding, the curing schedule was continued uninterrupted after one hour staging at 436 K (325° F.).

The consolidated billets were trimmed to closely fit a flat matched-metal mold having open ends in the 0° fiber direction which permitted observation of resin flow during molding. The matched mold was preheated to 478 K (400° F.) and charged with the billet, contact pressure was applied, and a heating rate of 2.8 K (5° F.) per minute established. At 546 K (525° F.), pressure was increased to 1.4 MPa (200 psig) over a one-minute span, held for one minute, decreased to zero MPa (psig) for fifteen seconds (a bumping action), and then reapplied at 1.4 MPa (200 psig). A maximum curing temperature of 589 K (600° F.) was attained and held for two hours. The panel was cooled at 2.8 K (5° F.) per minute under full pressure and removed at a temperature below 366 K (200° F.).

For panels completely autoclaved, B-staged billets were heated at 2.8 K (5° F.) per minute to 589 K (600° F.), with 1.4 MPa (200 psig) pressure applied at 547 K (525° F.). After curing at 589 K (600° F.) for two hours, the panels were cooled under autoclave pressure and full vacuum on the bag at 2.8 K (5° F.) per minute.

Pertinent properties of nine press molded panels are summarized as follows:

(1) Resin flow during molding: 2.0±0.5% by weight
(2) Weight loss during molding: 0.6 to 1.0%
(3) Average panel thickness: 0.312 cm±0.005 cm (0.123 inch±0.002 inch)
(4) Resin content, by acid digestion: 30% by weight
(5) Panel density, by weight/dimension measurements: 1.61 gm/cm$^3$
(6) Panel density, by displacement measurements: 1.55 gm/cm$^3$
(7) Ultrasonic "C"—Scan measurements: void free The autoclaved panels had an average thickness of 0.310 cm ±0.010 cm (0.122 in.±0.004 in.), and experienced an average total weight loss during molding of 30% by weight. The other properties listed above for the press-moldeds panels were not measured for autoclaved panels.

The press molded composites of the present invention demonstrated that this resin system overcomes one major obstacle previously noted in processing polyimides, i.e. lack of flow. The imidized material of the present invention flowed readily when heated above 533 K (500° F.). At a heating rate of 2.8 K (5° F.) the resin proceeded smoothly through the liquid state to a crosslinked system. In the region of full flow, the unrestrained resin evolved cyclopentadiene as determined by mass spectral measurements. This has been noted for other addition type polyimides that incorporate the nadic moiety. By pressurizing at 547 K (525° F.) and continuing the processing cycle, the resin of the present invention was cured with substantially no loss of the reaction cyclopentadiene which subsequently copolymerized to the crosslinked polymer state. Also, post cure of a graphite reinforced panel at 589 K (600° F.) for four hours in air caused no blistering and a weight loss of less than 0.1% suggesting that volatiles had not been entrapped during the cure cycle.

EXAMPLE VI

The resin can also be prepared by using only a stoichiometric amount of ethanol, i.e. enough to only form the ester-acid. The nadic anhydride (200 g, 1.22 mole) and BTDA (216 g, 0.67 mole) are refluxed with a stoichiometric amount of ethanol (151.1 g, 2.56 mole) in order to form the ester-acid mixture. Thus, one mole of anhydride+one mole of ethanol yields one mole of ester-acid. A slight excess of ethanol (up to 5%) may be added at this point in order to control the viscosity of the final mix.

After solution of the ester-acid mixture has been accomplished, 2.56 molar equivalents (252 g) of the amine mixture (as employed in the previous Examples) is mixed in at approximately 50° C. This elevated temperature is necessary to keep the viscosity low and insure proper mixing. This mixture is then cooled and may be stored for use in impregnating fiber in the absence of additional solvent (solventless prepregging) when heated to the temperature range of 50°–70° C. This technique of prepregging is generally referred to as "hot melt" prepregging and has heretofore been confined to epoxy resins due to the high temperatures needed for melting the polyimides.

It is thus seen that the foregoing specific Examples are illustrative of a novel addition polyimide system based on the use of liquid monomers wherein the essentially solventless prepreg produced therefrom retains good drape, tack, and other advantageous mechanical properties.

The specific Examples described herein are to merely illustrate the invention and are not to be deemed as exhaustive. Thus, various modifications and variations of the present invention will be apparent to those skilled in the art without departing from the spirit and scope of the appended claims.

What is claimed as new and desired to be secured by Letters Patent of the United States is:

1. A liquid composition of matter consisting essentially of an equimolar mixture of benzophenonetetracarboxylic acid diahydride and norbornene dicarboxylic acid anhydride reacted at 75°–80° C. in an excess of ethanol and thereafter cooled to room temperature and mixed with a mixture of the isomers of methylenedianilines in the following percentages:

o,o'—MDA—3.20% o,p'—MDA—15.70% p,p'—MDA—66.00%

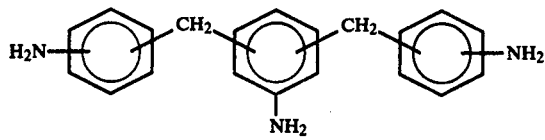

4.50% (all isomers), and,

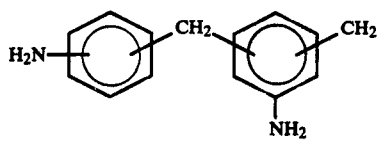

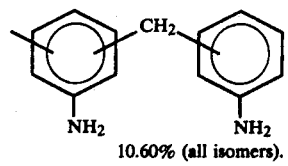

10.60% (all isomers).

2. A composition of matter as in claim 1 wherein the average molecular weight for the mixture of methylene dianilines is 234.

3. A method for preparing a novel addition type polyimide comprising the steps of reacting equimolar quantities of benzophenonetetracarboxylic acid dianhydride and norbornene diacarboxylic acid anhydride in an excess of absolute ethanol while heating to 50°–60° C. until solution occurs, cooling the resulting solution of ethylesters to room temperature and adding the cooled solution to a vessel containing an equimolar solution of mixed dianilines, stirring the combined solution for approximately one hour to obtain a homogeneous ester-acid polyimide prepolymer adaptable for "hot-melt" prepreg applications as a liguid resin system.

* * * * *